United States Patent Office 3,391,060
Patented July 2, 1968

3,391,060
PROCESS FOR PRODUCING A POLYSACCHARIDE
William H. McNeely, San Diego, Calif., assignor to Kelco Company, San Diego, Calif., a corporation of Delaware
No Drawing. Filed Jan. 27, 1966, Ser. No. 523,287
10 Claims. (Cl. 195—31)

This invention relates to a novel process for synthesizing certain polysaccharide polymers through the action of a bacteria of the genus Xanthomonas on carbohydrates. More particularly, the invention relates to a novel process in which the fermentation of carbohydrates by a bacteria of the genus Xanthomonas is carried out under controlled conditions to give a polysaccharide product of substantial purity without the use of elaborate purification procedures.

Much has been written about the production of polysaccharides through the fermentation of carbohydrates by bacteria of the genus Xanthomonas. The earliest work in this field was done by chemists at the Northern Regional Research Laboratory of the United States Department of Agriculture at Peoria, Ill. The process employed by the United States Department of Agriculture, hereinafter called the Peoria process, involved the culturing of a Xanthomonas bacterium in a well aerated medium containing commercial glucose, an organic nitrogen source, dipotassium hydrogen phosphate, and appropriate trace elements. The source of organic nitrogen usually employed is distillers' solubles and is available as Stimuflav from Hiram Walker.

The use of the organic nitrogen source specified in the Peoria process, contributes a substantial quantity of insolubles to the fermentation beer. These insolubles must be separated from the final polysaccharide product in order to obtain a pure product and the separation procedures required are elaborate. In the Peoria process, as described in an article by Allene Jeanes et al., J. App. Pol. Sci., V, 519 (1961), the purification procedures involved diluting the fermentation beer containing distillers' solubles with water, adding methyl alcohol to lower its viscosity and then filtering or centrifuging to remove insolubles. The resultant product was precipitated with alcohol and the entire process was repeated two more times before a product of sufficient purity was obtained. As a result of these elaborate separation procedures, the presently available Peoria process is quite costly. In addition, the polysaccharide product produced has an undesirable dark coloration, which results from the dark colored fermentation beer obtained through use of distillers' solubles.

An object of my invention is to provide a novel process for producing polysaccharides through the fermentation of carbohydrates with bacteria of the genus Xanthomonas, which employs little or no organic nitrogen source in the final fermentation medium.

A further object is to provide a process for preparing a Xanthomonas hydrophilic colloid through the fermentation of carbohydrates with a bacteria of the genus Xanthomonas, which fermentation is carried out in the presence of a soluble inorganic source of nitrogen.

A further object is to provide an improved process for the preparation of a Xanthomonas hydrophilic colloid through the fermentation of carbohydrates with bacteria of the genus Xanthomonas, which process does not require extensive separation procedures, to produce a high quality, high viscosity, light colored, high purity colloid.

Additional objects will become apparent from the description and claims which follow.

In accord with my invention, I have discovered that use of ammonium nitrate as an inorganic nitrogen source in the nutrient media used for fermentation of carbohydrates through the action of bacteria of the genus Xanthomonas greatly improves the purity of products without the need for elaborate purification procedures.

I have found that the concentration of ammonium nitrate in the fermentation medium is critical to the success of my process. When too great an amount of inorganic nitrogen is present, it produces a toxic effect on the growth of the Xanthomonas bacteria with the result that the production of Xanthomonas hydrophilic colloid is greatly reduced. Similarly, the use of too small an amount of inorganic nitrogen produces and adverse result because the nitrogen available is not sufficient to support adequate bacterial growth. The amount of ammonium nitrate employed ranges from about 0.02 to about 0.15 percent by weight of the fermentation medium. A preferred range of ammonium nitrate is from about 0.045 to about 0.09 percent by weight of the fermentation medium.

In practicing my invention, a suitable fermentation medium is inoculated with an organism of the genus Xanthomonas and permitted to incubate at room temperature under aerobic conditions for a period of about three days. The fermentation medium contains ammonium nitrate as specified previously. Further, however, the ferrentation medium contains other ingredients in addition to ammonium nitrate. A suitable carbohydrate is present in the nutrient medium in a concentration from about 1 to about 5% by weight. Suitable carbohydrates include, for example, dextrose, sucrose, maltose, fructose, lactose, and corn starch. As a suitable carbohydrate, crude sugars may be used such as deionized molasses or a product such as Hydrol E–081, manufactured by Corn Products Refining Co. Hydrol E–081 is a mixture composed largely of dextrose and maltose and includes small amounts of oligosaccharides. A further ingredient which is present in the fermentation medium is a source of magnesium ions. The magnesium ion content in the fermentation media is in trace amounts, i.e., about 0.0005 to about 0.0015 weight percent, and suitable sources of magnesium ions include magnesium sulfate heptahydrate, magnesium sulfate, magnesium acetate, magnesium chloride, magnesium nitrate, and magnesium acid phosphate.

The pH of the fermentation media is quite important to suitable growth of the Xanthomonas bacteria. I have found that the colloid production of the Xanthomonas bacteria becomes inefficient below a pH of about 6.1. The preferred pH range is from 6.5 to about 7.5. Control of the pH within this range can be obtained by the use of a buffer compound such as dipotassium acid phosphate at a concentration from about 0.4 to about 0.5 weight percent of the fermentation media. Conversely, the pH of the fermentation media can be controlled through conventional means such as the use of a pH meter coupled with a source of a suitable base, e.g., a solution of potassium hydroxide. As the pH is lowered due to the production of acids in the fermentation reaction, small quantities of the potassium hydroxide solution can be automatically added by the pH controller to keep the pH within the desired range.

In order to obtain a rapid fermentation, I have discovered that it is essential to have the correct amount of oxygen available for the growing bacterial culture. If either too little or too much oxygen is available, the production of Xanthomonas hydrophilic colloid by the culture is slowed down. My process requires that the oxygen made available produce a sulfite oxidation value within the range of about 1.5 to about 3.5 millimoles of oxygen per liter per minute. Preferred sulfite oxidation values are from 2.0 to 3.0 millimoles of oxygen per liter per minute. A description of sulfite oxidation value is set forth in an article in Industrial Engineering Chemistry, volume 36, page 504 (1936), by C. M. Cooper, G. A. Fernstrom, and S. A. Miller. The sulfite oxidation value is a measure of the rate of oxygen uptake in the fermentor under the agitation and aeration conditions employed.

In practicing my process, the Xanthomonas bacteria employed in the final fermentation is generally grown in several stages prior to its introduction into the final fermentation medium. In order to obtain satisfactory bacterial growth in the final fermentation medium, I have found it necessary to carefully control the fermentation medium in the seed fermentor where the bacteria are grown prior to their transfer to the final fermentation medium. The composition of the fermentation medium in the seed fermentor is essentially that employed in the final fermentation medium. In addition, however, I have found it necessary to employ a small quantity of an organic nitrogen source in the seed fermentation medium in an amount ranging from about 0.1 to about 0.5% by weight of the medium. Typical organic nitrogen sources are, for example, an enzymatic digest of soybean meal such as Soy Peptone Type T or Promosoy 100, a pancreatic hydrolysate of casein such as N-Z Amine Type AT, or an enzymatic digest of proteins such as Ferm-Amine Type IV. Promosoy 100 is sold by Central Soya Chemurgy Division and the other materials are sold by Sheffield Chemical, Norwich, N.Y. As defined, the organic nitrogen source employed in the seed fermentor is of a type which is most readily available as an enzymatic hydrolysate.

At least a trace quantity of phosphorus, generally in the form of a soluble phosphate salt, is also present in both the seed and final fermentation media. Larger quantities of phosphorus, up to about 0.6 percent by weight, calculated as dipotassium acid phosphate, of the fermentation media can, however, also be employed.

Although not essential, a very minor quantity of an organic nitrogen source, up to about 0.1% by weight, can be employed in the final fermentation medium in conjunction with the ammonium nitrate as previously described. Appropriate organic nitrogen sources are those described above.

I have found that a minimum of about 0.1% of an organic nitrogen source such as Soy Peptone Type T, N-Z Amine Type AT, Ferm-Amine Type IV or Promosoy 100 is required to build up the bacterial count in the seed fermentor to a satisfactory level. A concentration of more than 0.5% was found to give no further advantage. For best results, I employ a mixture of an inorganic nitrogen source, as defined previously, and an organic nitrogen source, in the seed fermentor. As an example, a seed of *Xanthomonas campestris* bacterial grown in a media containing 0.045% of ammonium nitrate and 0.3% of Soy Peptone Type T give a bacterial count of $5\times10^9$ bacterial/ml. after 24 hours of growth at 29° C. In contrast a seed of *Xanthomonas campestris* bacteria grown under the same conditions and in the same medium containing no Soy Peptone Type T gave a bacterial count of $1\times10^9$ bacteria/ml. after 24 hours.

My process works well for any of the various species of Xanthomonas bacteria. Illustrative species include *Xanthomonas campestris, Xanthomonas phaseoli, Xanthomonas malvacearum, Xanthomonas carotae, Xanthomonas begonide, Xanthomonas incanae*, and *Xanthomonas vesicatoria*. Of the various species of Xanthomonas bacteria, I prefer the *Xanthomonas campestris* and *Xanthomonas malvacearum* since these species work particularly well in my process.

To further illustrate my invention there are presented the following examples in which all parts and percentages are by weight unless otherwise illustrated.

EXAMPLE I

A stock culture of *Xanthomonas campestris* growing on a potato dextrose agar slant at 28° C. was used to inoculate a sterile YM agar slant. From the YM agar slant a transfer was made into 100 ml. of 2.1% YM broth in a 500 ml. Erlenmeyer flask. After 24 hours of incubation at 28–31° C. under aerobic conditions, the culture was transferred aseptically into 1300 ml. of sterile 2.1% YM broth in a 4-liter Fernbach flask. This flask was incubated for 24 hours under aerobic conditions at 28–31° C. The culture was then transferred aseptically into a 10-gallon fermentor containing 5 gallons of a sterile medium having the following composition:

| | | |
|---|---|---|
| Ammonium nitrate (0.045%) | gms. | 13.5 |
| Soy Peptone Type T (Sheffield Chemical Co.) (0.3%) | gms. | 57 |
| Dipotassium acid phosphate (0.5%) | gms. | .95 |
| Magnesium sulfate heptahydrate (0.01%) | gms. | 1.9 |
| Glucose | gms. | 379 |
| Water | kilograms. | 18.4 |

The ingredients for YM broth are sold by the Difco Chemical Company in a mixture containing the following ingredients in the following proportions:

| | Gms. |
|---|---|
| Bacto yeast extract | 3 |
| Malt extract, Difco | 3 |
| Bacto-peptone | 5 |
| Bacto-dextrose | 10 |

The above mixture of ingredients are used to form a nutrient broth by adding a sufficient amount of water to form 1 liter of material.

The 10-gallon fermentor was maintained at a temperature of 28–31° C. for 24 hours under aeration and agitation to give a sulfite oxidation value in the range of 2.0 to 3.0 millimoles of oxygen per liter of medium per minute.

The high bacteria count culture was then transferred aspectically into 60 gallons of a sterile medium in a 100-gallon fermentor. The medium in the 100-gallon fermentor had the following composition:

| | | |
|---|---|---|
| Ammonium nitrate (0.045%) | gms. | 102 |
| Soy Peptone Type T (0.3%) | gms. | 682 |
| Dipotassium acid phosphate (0.5%) | gms. | 1,135 |
| Magnesium sulfate heptahydrate (0.01%) | gms. | 23 |
| Glucose | gms. | 3,000 |
| Water to make 60 gallons. | | |

The fermentor was maintained at a temperature of 28–31° C. for 24 hours under aeration and agitation to give a sulfite oxidation value in the range of 2.0 to 3.0 millimoles of oxygen per liter of medium per minute.

This high count bacterial culture was transferred aseptically into 1400 gallons of a sterile medium in a final 2,000-gallon fermentor, the medium having the following composition:

| | Percent |
|---|---|
| Ammonium nitrate | 0.06 |
| Dipotassium acid phosphate | 0.5 |
| Magnesium sulfate heptahydrate | 0.01 |
| Glucose | 2.25 |
| Water | 97.18 |

The fermentor was maintained at a temperature of 28–31° C. for 72 hours under a combination of aeration and agitation to give a sulfite oxidation value in the range of 2.0 to 3.0 millimoles of oxygen per liter of medium per minute. At the end of the 72 hours the fermentation beer had a viscosity of 3,000 cps. at 25° C. as determined by the Brookfield viscometer model LVF using a No. 3 spindle rotating at 60 r.p.m. The colloid content of the beer was 1.5% and the sugar content was less than 0.1%.

The fermented beer was precipitated with isopropyl alcohol such that the isopropyl alcohol content in the precipitation beer was 60% by weight. The precipitated *Xanthomonas campestris* hydrophilic colloid was washed with an aqueous alcohol mixture and extruded through a continuous screw press to recover the aqueous-alcohol mixture. The pressed cake was dried and milled. The yield of colloid was 170 pounds. This unusually light-cream colored powder redissolved in water readily to give a light-colored hazy solution having a Brookfield viscosity of 1100 cps. at a 1% as is concentration of colloid.

EXAMPLE II

The run was carried out in the manner described in Example I except that dipotassium acid phosphate was omitted from the media in the 10-gallon, 100-gallon, and 2,000-gallon fermentors, and the fermentors were set up for pH control by the addition of a sterile 10% potassium hydroxide solution. A Beckman pH electrode and controller was used to control a Sigma pump (Sigmamotors, Inc., Middleport, N.Y.), as required. A total of 30 grams, 360 grams and 18 pounds of potassium hydroxide, calculated on the dry basis, was used to maintain the pH in the 10-gallon fermentor, 100-gallon fermentor and 2,000-gallon fermentor, respectively.

At the end of 72 hours in the 2,000-gallon fermentor the fermentation beer had a viscosity of 2,900 cps. as determined by the Brookfield viscometer. The content of *Xanthomonas campestris* hydrophilic colloid in the fermented beer was 1.48% and the sugar content was less than 0.1%.

The colloid content of the fermented beer from the 2,000-gallon fermentor was precipitated as described in Example I. The recovery of colloid was 168 pounds. A light-colored powder was obtained which readily redissolved in water to give a light-colored hazy solution having a viscosity of 1150 cps. at a 1% as is concentration of colloid with the viscosity being determined as described in Example I.

As shown by the foregoing examples, my process provides a light-colored, high quality Xanthomonas hydrophilic colloid without requiring extensive separation and purification procedures as in the Peoria process.

The Xanthomonas hydrophilic colloids produced by my process are, as stated previously, colloidal materials produced by bacteria of the genus Xanthomonas. Illustrative of such colloidal materials is the hydrophilic colloid produced by *Xanthomonas campestris* bacterium. This colloid is a high molecular weight, exocellular material in which the polymer contains mannose, glucose, potassium glucuronate and acetyl radicals. The potassium portion of the colloid can be replaced by several other cations without substantial change in the properties of the material.

The Xanthomonas hydrophilic colloids produced according to my process may be employed as additives in drilling muds to reduce fluid loss and to suspend the solid materials contained in the mud. Moreover, the colloids may be employed as thickening agents in producing thickened water to be used in the secondary recovery of oil through water flooding.

In illustrating my invention, I have made reference to specific times, temperatures, compositions, etc. However, I intend that my invention be limited only by the lawful scope of the appended claims and not by the foregoing description.

I claim:

1. A process for producing a Xanthomonas hydrophilic colloid, said process comprising incubating a final fermentation medium including an inoculum organism of the genus Xanthomonas, said medium containing a carbohydrate at a concentration from about 1 to about 5% by weight, magnesium ions and phosphorus in at least trace amounts, water, and ammonium nitrate in an amount from about 0.02 to about 0.15% by weight, aerating said fermentation medium at a rate sufficient to produce a sulfite oxidation value ranging from about 1.5 to about 3.5 millimoles of oxygen per liter per minute, maintaining the pH of the fermentation medium within the range from about 6.5 to about 7.5 and recovering the hydrophilic colloid produced by said Xanthomonas bacteria.

2. The process of claim 1 wherein said fermentation medium also contains an organic nitrogen source in an amount up to about 0.1% by weight.

3. The process of claim 1 wherein said bacteria is the species *Xanthomonas campestris.*

4. The process of claim 1 wherein the aeration rate is maintained to produce a sulfite oxidation value within the range from 2 to 3 millimoles of oxygen per liter per minute.

5. A process for producing Xanthomonas bacteria in a seed fermentation medium, said medium containing a carbohydrate at a concentration from about 1 to about 5% by weight, at least trace amounts of magnesium ions and phosphorus, water, ammonium nitrate at a concentration from about 0.02 to about 0.15% by weight, and an organic nitrogen source in an amount from about 0.1 to about 0.5% by weight, and said bacteria, maintaining said medium at a pH from about 6.5 to about 7.5, and aerating said seed fermentation medium at a rate to produce a sulfite oxidation value from about 1.5 to about 3.5 millimoles of oxygen per liter per minute.

6. The process of claim 5 wherein said bacteria is the species *Xanthomonas campestris.*

7. A process for producing a Xanthomonas hydrophilic colloid, said process comprising incubating a fermentation medium including an inoculum organism of the genus Xanthomonas produced according to claim 5, said medium containing a carbohydrate at a concentration from about 1 to about 5% by weight, magnesium ions and phosphorus in at least trace amounts, water, and ammonium nitrate in an amount from about 0.02 to about 0.15% by weight, aerating said fermentation medium at a rate sufficient to produce a sulfite oxidation value ranging from about 1.5 to about 3.5 millimoles of oxygen per liter per minute, maintaining the pH of the fermentation medium within the range from about 6.5 to about 7.5 and recovering the hydrophilic colloid produced by said Xanthomonas bacteria.

8. The process of claim 7 wherein said fermentation medium also contains an organic nitrogen source in an amount up to about 0.1% by weight.

9. The process of claim 7 wherein said bacteria is the species *Xanthomonas campestris.*

10. The process of claim 7 wherein the aeration rate is maintained to produce a sulfite oxidation value within the range from 2 to 3 millimoles of oxygen per liter per minute.

No references cited.

ALVIN E. TANENHOLTZ, *Primary Examiner.*